United States Patent
Atkinson et al.

[11] Patent Number: 6,139,974
[45] Date of Patent: Oct. 31, 2000

[54] FORMING A COMPOSITE PANEL

[75] Inventors: Alan William Atkinson, Nr Rugby; David Richard Bridge, Oldham; Andrew Timothy Cole, Rugby, all of United Kingdom

[73] Assignee: Federal-Mogul Technology Limited, Rugby, United Kingdom

[21] Appl. No.: 09/230,982

[22] PCT Filed: Jul. 17, 1997

[86] PCT No.: PCT/GB97/01940

§ 371 Date: Feb. 4, 1999

§ 102(e) Date: Feb. 4, 1999

[87] PCT Pub. No.: WO98/06567

PCT Pub. Date: Feb. 19, 1998

[30] Foreign Application Priority Data

Aug. 10, 1996 [GB] United Kingdom .................. 9616849

[51] Int. Cl.⁷ .............. B32B 3/28; B32B 15/04; B21D 39/03

[52] U.S. Cl. ............. 428/595; 428/614; 29/521; 72/363; 72/379.6; 52/783.14

[58] Field of Search .................... 428/603, 604, 428/595; 72/379.6, 363; 29/457, 521; 52/783.14, 789.1, 796.1

[56] References Cited

U.S. PATENT DOCUMENTS

| | | | |
|---|---|---|---|
| 512,021 | 1/1894 | Gould | 29/521 |
| 1,013,070 | 12/1911 | Savage | 29/521 |
| 1,206,487 | 11/1916 | Voltz et al. | 29/521 |
| 1,716,402 | 6/1929 | Whippey | 29/521 |
| 1,996,004 | 3/1935 | Fraser | 428/604 |
| 2,481,046 | 9/1949 | Scurlock | 428/604 |
| 3,217,845 | 11/1965 | Reynolds et al. | 428/604 |
| 3,256,669 | 6/1966 | Seiwert | 52/615 |
| 3,474,585 | 10/1969 | Foster | 29/521 |
| 3,540,109 | 11/1970 | Marthaler | 29/521 |
| 3,902,348 | 9/1975 | Hale | 72/342 |
| 4,343,866 | 8/1982 | Oser et al. | 428/593 |
| 4,656,809 | 4/1987 | Wilson | 52/795 |
| 4,831,711 | 5/1989 | Rapp | 29/521 |
| 5,157,893 | 10/1992 | Benson et al. | 52/792 |
| 5,517,743 | 5/1996 | Liebig et al. | 29/521 |
| 5,670,264 | 9/1997 | Sheridan | 428/604 |
| 5,939,212 | 8/1999 | Ragland et al. | 428/604 |

FOREIGN PATENT DOCUMENTS

| | | |
|---|---|---|
| 46796 | 4/1889 | Germany . |
| 240269 | 11/1911 | Germany . |
| WO 88/01722 | 3/1988 | WIPO .............. F28F 3/08 |

*Primary Examiner*—John J. Zimmerman
*Attorney, Agent, or Firm*—Synnestvedt & Lechner LLP

[57] ABSTRACT

A composite panel is formed by bonding together at least two overlying sheets of metal. The method comprises performing a first corrugating operation on each of said sheets, and positioning said sheets in overlying relationship with the corrugations of each sheet extending in a common first direction and the corrugations of each sheet nested into those of the other sheet. The method also comprises performing a second corrugating operation arranged to produce corrugations which extend in a second direction which is inclined at an angle of at least 10° to said first direction. Each sheet is formed into parallel upstanding ridges separated by troughs. The troughs in each sheet are received within the ridges of the other sheet. The troughs have reentrant side walls and the ridges vary in width along their length.

10 Claims, 3 Drawing Sheets

FORMING A COMPOSITE PANEL

This invention is concerned with forming a composite panel by bonding together at least two overlying sheets of metal. The invention is also concerned with such a composite panel.

There are many applications for composite panels of the type referred to above. For example, such panels can be used in structural applications. One particular application occurs in the automotive industry where such panels can be used as heat shields to protect passengers or heat-sensitive equipment from heat generated by the engine of a vehicle. Such heat shields have to be rigid enough to retain their shape and resist damage while preventing the passage of a significant proportion of the heat generated. A single sheet of metal, eg aluminum or an alloy thereof, can reflect infra-red radiation and reduce convection but it has poor acoustic properties as it acts like a drum.

If a composite panel formed from two bonded sheets of metal is used as an automotive heat shield, better acoustic properties are obtained, since each sheet damps vibrations of the other, and also there is some reduction in heat conduction, because of the interface between the sheets. It is also possible to provide heat insulating material and/or sound deadening material between the sheets.

In order to achieve good acoustic properties, the sheets of a composite panel need to be bonded together at close intervals across their area. This can be achieved by the use of adhesive. However, adhesives can fail under extreme conditions, and their presence prevents the panel from being readily recycled at the end of its life. It is also possible to use a large number of mechanical fasteners, such as rivets or staples, distributed over the area of the panel but this is expensive and provides additional heat conduction paths through the panel. It is also possible to emboss the sheets together to interlock them but this requires expensive tooling.

It is an object of the present invention to provide a method of forming a composite panel by bonding together at least two overlying sheets of metal so that they are bonded together across an area without the use of adhesive or mechanical fasteners or requiring expensive tooling The invention provides a method of forming a composite panel by bonding together at least two overlying sheets of metal, characterised in that the method comprises performing a first corrugating operation on each of said sheets so that both sheets are formed with similar corrugations, and positioning said sheets in overlying relationship with the corrugations of each sheet extending in a common first direction and the corrugations of each sheet being nested into those of the other sheet, the method also comprising performing a second corrugating operation on the assembly of the two overlying corrugated sheets, said second corrugating operation being arranged to produce corrugations which extend in a second direction which is inclined at an angle of at least 10° to said first direction.

A method according to the invention results in composite panels which have upstanding ridges with troughs between them, these troughs having reentrant side walls so that the sheets are bonded by the interlocking of the portions of the sheets forming said side walls. Said side walls could also be regarded as undercut folds running across the sheets. A method according to the invention enables the complexly shaped composite panel to be manufactured simply without requiring expensive tooling. All that is required is one or two sets (depending on whether the same set is used for both corrugating operations) of corrugating rollers. Such corrugating rollers are well-known as they are used to corrugate metal sheets for, eg, roofing and to corrugate cardboard. Such rollers have sinusoidal ridges extending along their surfaces. A set of rollers comprises an upper and a lower roller whose ridges mesh with one another and press a sheet into corrugations as it passes through the nip between the rollers.

In a method in accordance with the invention, it is not necessary for the sheets to be joined over their entire area or for the sheets to completely overlie one another. Indeed, the method can be used to join overlapping edges of adjacent sheets.

Composite panels made by a method according to the invention are suitable for use as automotive heat shields as they exhibit good acoustic properties. In many cases, these properties and the heat insulating properties are improved by small air gaps formed between the sheets at the ends of the reentrant sidewalls.

Although sheets can be joined with said angle between the corrugating operation directions as low as 10°, it is preferred that, in a method according to the invention, said angle is at least 30°, eg 45°, and, most preferably, said angle is substantially 90° which is found in many cases to give optimum bonding combined with flexibility in different directions.

In carrying out a method in accordance with the invention, said sheets may be positioned in overlying relationship either be-ore or after said first corrugating operation. Preferably, however, said sheets are first positioned in overlying relationship, and said first corrugating operation is carried out simultaneously on both sheets, while they are in said overlying relationship, by passing the sheets between corrugating rollers. This produces the required corrugations in both sheets which extend in a common first direction and the corrugations of each sheet being nested into those of the other sheet. It is, however, possible to corrugate the sheets separately and then nest them.

Said second corrugating operation may be carried out by passing the sheets between corrugating rollers which are arranged to produce similar corrugations to those produced in the first corrugating operation, ie the depth and spacing of the ridges on the corrugating rollers may be the same for both the first and the second corrugating operations. Indeed, the same rollers could be used for both corrugating operations. However, it is possible to vary the corrugation depth and/or spacing between the first and the second corrugating operations, eg to vary the stiffness of the panel in different directions or to produce uniform stiffness.

In a method according to the invention, said first corrugating operation may produce corrugations which are generally sinusoidal, when viewed in transverse cross-section. It is, however, possible to use corrugations with other cross-sections.

Where a panel with heat insulating or sound deadening properties is required, the method may also comprise positioning a layer of heat insulating or sound deadening material between said sheets before said second corrugating operation.

A method in accordance with the invention may be used to form a panel with more than two overlying sheets and may include a final pressing or rolling operation to reduce the thickness of the panel, this causing the reentrant side walls to increase their inclination.

The invention also provides a composite panel formed from at least two overlying sheets of metal which are bonded together, characterised in that the sheets are bonded together by each sheet being formed into a plurality of generally parallel upstanding ridges separated by troughs, the troughs in each sheet being received within the ridges of the other sheet, the troughs having reentrant side walls and the ridges varying in width along their length.

In a panel according to the invention, the sheets are bonded together across an area of the panel by the interengagement of the ridges of one sheet with the troughs of the other. The reentrant side walls of the troughs prevent the sheets from separating in a direction normal to the plane of the panel. The variation in the width of the ridges, and hence of the troughs, prevents the sheets from separating in a direction extending longitudinally of the ridges. The panel is also stiffened by the ridges. Although a panel according to the invention has a very complex shape, it can be manufactured very simply by a method in accordance with the invention.

Preferably, said ridges vary in width in a regular manner. Said ridges may vary in height along the length of the ridge with the greatest height occurring at the narrowest points of the ridge. This structure enables the panel to be bent about lines extending transversely of the ridges as well as about lines extending longitudinally thereof. The variation in height may be substantially sinusoidal. Of course, the troughs must conform to the width and height variations of the ridges. Thus, said troughs vary in depth along their length with the greatest depth occurring at the narrowest points of the troughs. In some cases, the lowest points of the ridges may be lower than the highest points of the troughs, but, of course, such lowest and highest points are displaced from one another longitudinally of the ridges or troughs.

In order to reduce the overall thickness of the panel, the ridges may each have a crest which is substantially flat in a direction transverse to the length of the ridge.

In order to improve its properties, the panel may also comprise a layer of heat insulating or sound-deadening material is sandwiched between said sheets. Such a layer may be of cloth or sheet material, eg expanded graphite. Where the panel has three or more sheets of metal, there may be two or more such layers.

A composite panel according to the invention may be formed from two sheets of the same or different metals, eg aluminum or an alloy thereof or steel, and the two sheets may have the same or different thicknesses. For example, the sheets may have a thickness of at least 125 microns. Thicknesses of 0.3 to 1 mm have been found to be useful for automotive heat shields.

There now follows a detailed description, to be read with reference to the accompanying drawings, of a composite panel and its method of manufacture which are illustrative of the invention.

Figure 1:
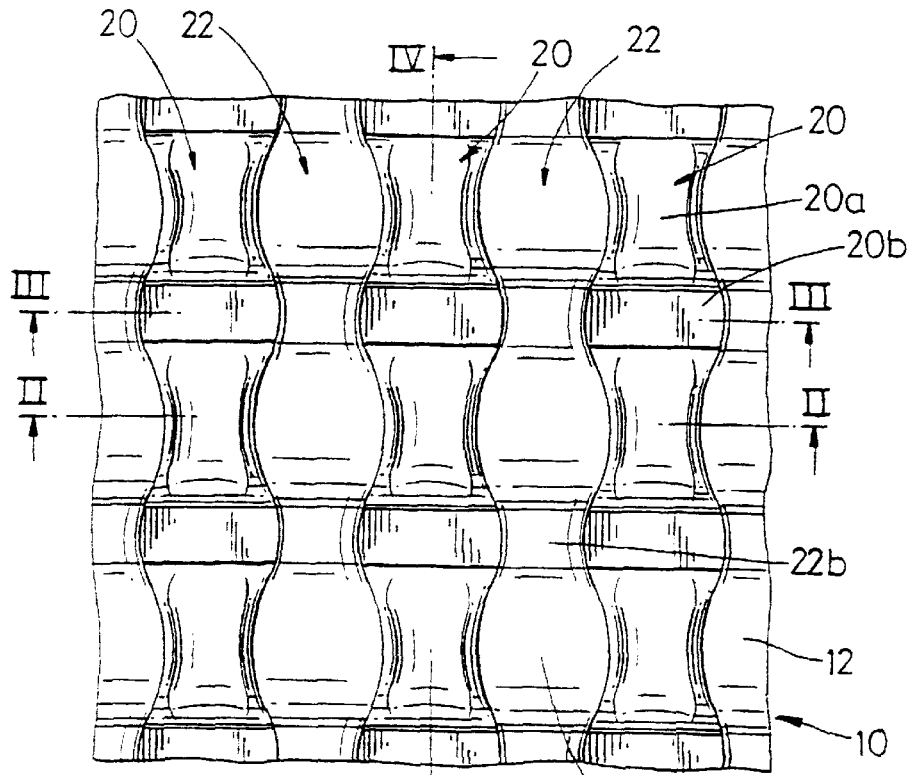
FIG. 1 is an enlarged plan view of a portion of the illustrative panel.

The illustrative method forms the illustrative composite panel 10 by bonding together two overlying sheets of metal 12 and 14, the sheets being made of aluminum alloy and being both 0.3 mm in thickness. At the beginning of the illustrative method, the sheets 12 and 14 have the same size and shape and are planar.

The illustrative method comprises performing a first corrugating operation on each of said sheets 12 and 14 so that both sheets are formed with similar corrugations. The corrugations are of conventional form, being sinusoidal in transverse cross-section, and extend parallel to one another in a first direction across each sheet 12 and 14. The illustrative method also comprises positioning said sheets 12 and 14 in overlying relationship with the corrugations of each sheet extending in a common first direction and the corrugations of each sheet being nested into those of the other sheet, ie the crests of the corrugations of the sheet 14 directly underlie the crests of the corrugations of the sheet 12. These stages of the illustrative method are carried out by first positioning the sheets 12 and 14 in overlying relationship with the sheet 12 directly and completely on top of the sheet 14. Next, said first corrugating operation is carried out simultaneously on both sheets, while they are in said overlying relationship, by passing the sheets between corrugating rollers of conventional type.

The illustrative method also comprises performing a second corrugating operation on the assembly of the two overlying corrugated sheets 12 and 14. This is carried out by passing said assembly between similar corrugating rollers to those used in the first corrugating operation. However, in the second corrugating operation, the direction of travel of the sheets 12 and 14 relative to the rollers is at 90° to their direction of travel relative to the corrugating rollers in the first corrugating operation. Thus, said second corrugating operation is arranged to produce corrugations which extend in a second direction which is inclined at an angle of 90° to said first direction (the direction of the corrugations formed by said first corrugating operation).

The illustrative composite panel 10 formed by the illustrative method is shown in the drawings. In the panel 10, the sheet 12 directly overlies the sheet 14 (so that in FIG. 1 only the sheet 12 is visible) and the two sheets 12 and 14 are bonded together by being formed so that they are interlocked with one another. Specifically, each sheet 12 and 14 is formed into a plurality of generally parallel upstanding ridges 20 separated by troughs 22. The ridges 20 and troughs 22 vary in height along their length, the ridges 20 having peaks 20a and hollows 20b and the troughs having peaks 22a and hollows 22b. Although the ridges 20 area at any point higher than the immediately adjacent portions of the troughs 22 on either side of the ridge, the peaks 22a of the troughs 22 are in fact higher than the hollows 20b of the ridges 20.

The troughs 22 in each sheet 12 and 14 are received within the ridges 20 of the other sheet. The interlocking of the sheets 12 and 14 means that they cannot be separated without being deformed. The longitudinal direction of the ridges 20 represents the longitudinal direction of the corrugations formed by the first corrugating operation but these corrugations have been deformed by the second corrugating operation. The shape of the ridges 20 and troughs 22 is complex and is described below.

FIG. 1 shows, in plan view, a portion of the upper surface of the composite panel 10. As this upper surface is formed solely by the sheet 12, since the sheet 14 is covered by the sheet 12, FIG. 1 shows the ridges 20 and troughs 22 of the sheet 12. The lower surface of the composite panel 10, not shown, is formed solely by the sheet 14 and has a similar appearance to said upper surface except that the lower surface is off-set by half the spacing between adjacent ridges 20. Thus, a description of the ridges 20 and troughs of the sheet 12 can also serve to describe those of the sheet 14.

Figure 2:
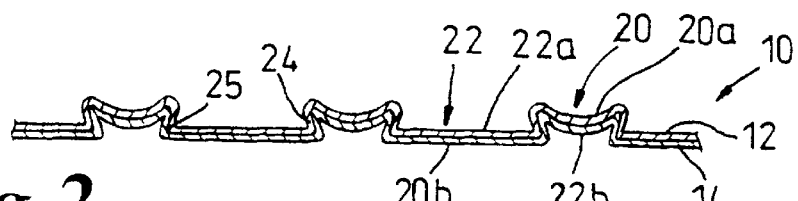
FIG. 2 is a cross-sectional view taken on the line II—II in FIG. 1.
Figure 3:
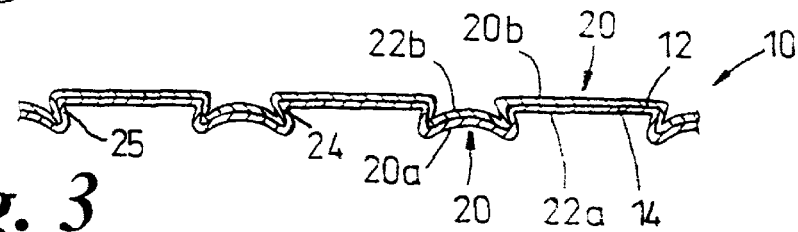
FIG. 3 is a cross-sectional view taken on the line III—III in FIG. 1.
Figure 4:
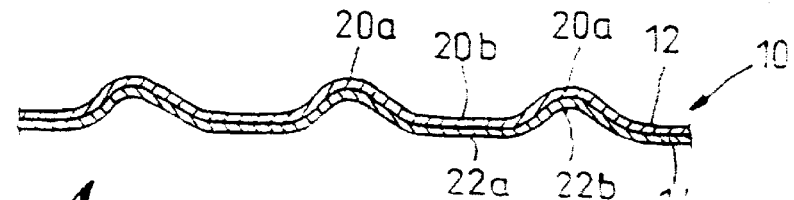
FIG. 4 is a cross-sectional view taken on the line IV–IV in FIG. 1.

Each ridge 20 has a relatively broad crest. This crest varies in height along its length having peaks 20a and hollows 20b. As shown in FIG. 2, the crest of the ridge 20 is dished downwardly at its peaks 20a but, as shown in FIG. 3, the crest is substantially flat at its hollows 20b. As shown in FIGS. 1 to 3, the crest varies regularly in width along the ridge 20, having its greatest width at the hollows 20b and its smallest width at the peaks 20a. From FIG. 4, it can be seen that the crest varies in height along the length of the ridge 20. FIG. 1 also illustrates that the narrowest points of adjacent ridges 20 are spaced from one another along lines extending normally to the longitudinal direction of the ridges.

As is shown in FIGS. 1 to 3, the troughs 22 each have a relatively broad bottom which corresponds to the shape of the crests of the ridges 20 so that the trough bottoms formed by the sheet 12 can overlie the crests formed by the sheet 14 and vice versa. Thus, each bottom has broad peaks 22a which are substantially flat in a direction transverse to the length of the trough 22 (see FIGS. 2 and 3), and narrow hollows 22b which are dished upwardly. From FIG. 4 (where the trough bottom of the sheet 14 is shown at the lower side of the Figure), it can be seen that the bottom varies in height with its peaks 22a directly opposite to the hollows 20b of the ridges 20 of the sheet 12, ie the hollows 20b of the sheet 12 directly overlie the peaks 22a of the sheet 14. Also, the peaks 20a of the sheet 12 directly overlie the hollows 22b of the sheet 14.

As illustrated by FIGS. 2 and 3, the troughs 22 have side walls 24 (which also form the side walls of the ridges 20). These side walls 24 are reentrant so that the troughs 22 are narrower at their mouths between the crests of the ridges than at their bottoms. Each wall 24 follows the undulations of the trough 22 along its length and meets the crest of one of the ridges 20 and the bottom of one of the troughs 22 at angles which are both less than 90°. As shown in FIGS. 2 and 3, the walls 24 formed by the sheet 12 and the walls 24 formed by the sheet 14 are next to one another. Although not shown in FIGS. 2 and 3, small air gaps form between the sheets 12 and 14 at points 25 at the upper and lower ends of the side walls 24 where the curvature of the sheets 12 and 14 is greatest.

The reentrant side walls 24 of the troughs 22 prevent the sheets 12 and 14 from separating in a direction normal to the plane of the panel 10. The variation in the width of the ridges 20, and hence of the troughs 22, prevents the sheets 12 and 14 from separating in a direction extending longitudinally of the ridges.

Figure 5:
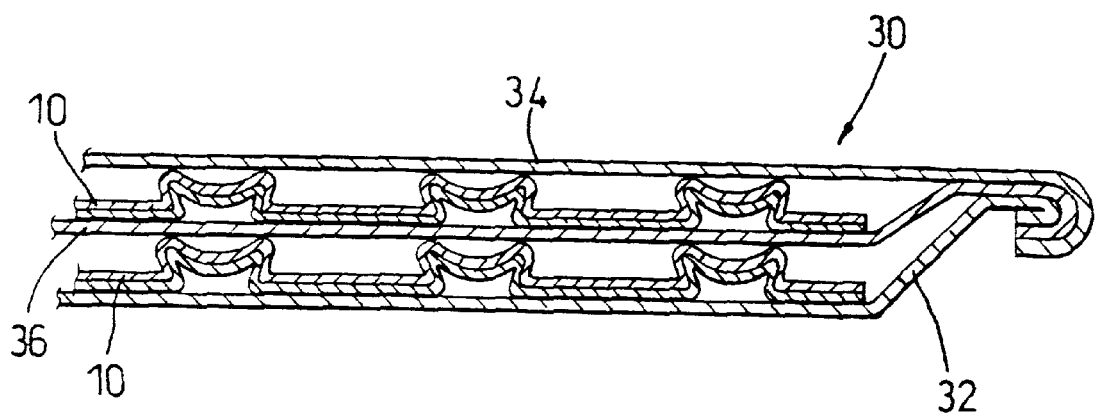
FIG. 5 is a cross-sectional view of a portion of a heat shield incorporating the illustrative panel.

FIG. 5 shows a heat shield 30 which comprises a shallow box formed by a bottom sheet 32 and a top sheet 34. Side walls of the box are formed by upwardly extending edges of the sheet 32. The top sheet 34 is turned over the edges of the bottom sheet 34 to join the sheets 32 and 34 together to close the box. The sheets 32 and 34 are formed of aluminum.

Figure 6:
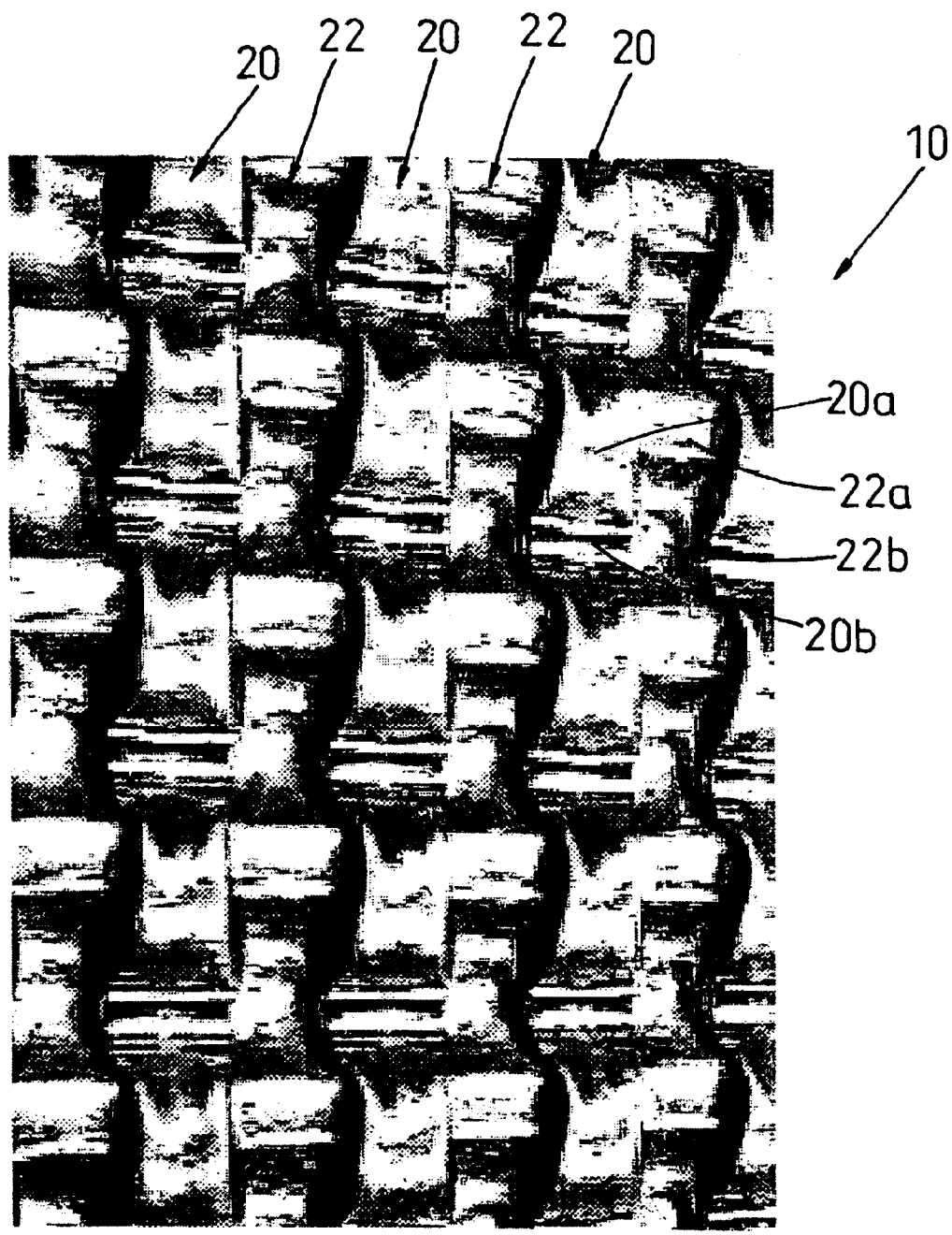
FIG. 6 is a computer scan of a portion of the illustrative panel.

The heat shield 30 also comprises two panels 10 as described in relation to FIGS. 1 to 4 and shown in FIG. 6. The shield 30 also comprises a layer of thermally insulating paper 36 which is disposed between the two panels 10. The paper 36 may, for example be formed from the material marketed under the trade name "Fiberfrax 970". One of these panels 10 rests on the upper surface of the bottom sheet 32 with the paper 36 on top of it and the other panel 10 is on top of the paper 36 and beneath the lower surface of the sheets 34.

The heat shield 30 can be utilised with either the lower surface of the sheet 32 or the upper surface of the sheet 34 facing a source of heat. The heat shield 30 has air trapped in it as the ridges 20 hold the sheets 32 and 34 apart. Modifications of the heat shield 30 can omit the paper 36 or may have only one panel 10 or more than two panels 10. The sheets 32 and 34 prevent dirt from accumulating in the folds of the panels 10.

FIG. 6 illustrates the appearance of the illustrative panel 10 as scanned by a computer. The figure shows the ridges 20 and the troughs 22 and also the peaks 20a and 22a and the hollows 20b and 22b.

What is claimed is:

1. A method of forming a composite panel by bonding together at least two overlying sheets of metal, wherein the method comprises performing a first corrugating operation on each of said sheets so that both sheets are formed with similar corrugations, and positioning said sheets in overlying relationship with the corrugations of each sheet extending in a common first direction and the corrugations of each sheet being nested into those of the other sheet, the method also comprising performing a second corrugating operation on the assembly of the two overlying corrugated sheets, said second corrugating operation being arranged to produce corrugations which extend in a second direction which is inclined at an angle of at least 10° to said first direction.

2. A method according to claim 1, wherein said angle is substantially 90°.

3. A method according to claim 1, wherein said sheets are first positioned in overlying relationship, and said first corrugating operation is carried out simultaneously on both sheets, while they are in said overlying relationship, by passing the sheets between corrugating rollers, thereby producing corrugations in both sheets which extend in a common first direction and the corrugations of each sheet being nested into those of the outer sheet.

4. A method according to claim 1, wherein the second corrugating operation is carried out by passing the sheets between corrugating rollers which are arranged to produce similar corrugations to those produced in the first corrugating operation.

5. A method according to claim 1, wherein the method also comprises positioning a layer of heat insulating or sound deadening materiaL between said sheets before said second corrugating operation.

6. A composite panel formed from at least two overlying sheets of metal which are bonded together, wherein the sheets are bonded together by each sheet being formed into a plurality of generally parallel upstanding ridges separated by troughs, the troughs in each sheet being received within the ridges of the other sheet, the troughs having reentrant side walls and the ridges varying in width along their length.

7. A panel according to claim 6, wherein said ridges vary in width in a regular manner.

8. A panel according to claim 7, wherein said ridges vary in height along the length of the ridge with the greatest height occurring at the narrowest points of the ridge.

9. A panel according to claim 6, wherein a layer of heat insulating or sound-deadening material is sandwiched between said sheets.

10. A panel according to claim 6, wherein the panel is incorporated in a heat shield.

\* \* \* \* \*